Patented Mar. 6, 1945

2,370,663

UNITED STATES PATENT OFFICE 2,370,663

ORGANIC CYANAMIDE TRANSMISSION-
FLUIDS

William H. Hill, Mount Lebanon, Pa., assignor, by
mesne assignments, to Koppers Company, Inc.,
a corporation of Delaware No Drawing. Application November 12, 1941,
Serial No. 418,845

7 Claims. (Cl. 252—77)

The present invention relates to the art of transmitting power through the medium of a fluid and is more especially directed to liquids that are employed in such hydraulic-pressure apparatus as form a part, for example, of the brake systems of automobiles and airplanes, of lifting devices and check valves, and the recoil mechanisms of heavy guns.

An object of the present improvement is the provision of a new and novel class of organic compounds that is of special utility as the active hydraulic medium for transmitting power in pressure apparatus and is non-corrosive to metals and also does not deleteriously affect rubber, and the like, that is usually employed in hydraulic-pressure equipment.

A further object of invention is the provision for the stated purpose of a novel class of organic compounds that is compatible with well-known hydraulic liquids comprising oxygen-containing organic liquids, for example, castor oil and the polyhydric alcohols, so that the beneficial properties of these latter materials and those of the compounds provided by the invention can both be simultaneously enjoyed in the same hydraulic-pressure system, and a partial or a complete substitution of castor oil or polyhydric alcohols that may be present in an hydraulic-pressure system, can be accomplished by the present improved materials while at the same time retaining the whole of the hydraulic liquid medium in such a system in a single phase.

The invention has for further objects such other improvements and such operative advantages or results as may be found to obtain in the processes or apparatus hereinafter described or claimed.

The present invention provides substituted organic derivatives of the compound cyanamide as the active agent in transmitting power, in a system therefor, by means of an hydraulic liquid. Those substituted organic derivatives of cyanamide having lower molecular weights are colorless, neutral liquids that are non-corrosive to such metals as, aluminum, copper, brass, or iron, and they exhibit very little affinity toward rubber which they do not deteriorate at ordinary temperatures or at those somewhat above nor cause to swell except to a minimal degree. A rubber plunger cap such as is used in hydraulic-pressure systems showed only about one per cent of swelling after being in contact with diethyl cyanamide for one year. The said cyanamide derivatives advantageously have a low temperature-susceptibility over a wide temperature range, their low vapor pressure precludes vapor-binding of a system wherein they are employed and their high tolerance for water, which may adventitiously enter the apparatus system, prevents the same from appearing as a separate phase, even at relatively low temperatures.

With increasing weight of the organic radical attached to the cyanamide structure, the resulting derivatives thereof pass from liquids to solids at ordinary temperatures, and mixtures, for example, of those compounds that are ordinarily liquid with those that are ordinarily solid are especially useful in that they make possible the provision of liquid mixtures having high boiling points and exhibiting a wide diversity of vapor pressures, viscosities and of temperature-susceptibilities, thus making them of utility in divers apparatus and applications for transmission of power by a liquid medium. For example, airplanes customarily flying at the cold higher altitudes need a less viscous hydraulic fluid than those operating at lower levels, and the brakes of motor vehicles customarily operated in regions of high temperature, such as desert terrains, will require an hydraulic fluid having a higher boiling point and a lower vapor pressure than those used in northern regions, and all these different requirements can be easily met by the simple expedient of determining empirically those organic substituents of cyanamide or mixtures thereof that give the most satisfactory results for a given set of conditions.

Furthermore, by taking advantage of specific characteristics of the substituent radicals to alter specific properties of the resulting cyanamide product, it is possible to provide for a particular use a substituted cyanamide having a specific property or properties. For example, diethanol cyanamide has advantages over diethyl cyanamide in those applications of the compounds provided by the invention where it is desirable that the hydraulic liquid have greater viscosity or an enhanced tolerance for water such as when the latter forms an effective constituent of the hydraulic liquid or where it is advantageous to employ a mixture thereof with the polyhydric alcohols, such as glycol, or the like. In other uses, the required substituted cyanamide medium or media may need to have a quite high boiling point, so as to prevent vapor-binding; for example, in an hydraulic-pressure system, wherein there is little, if any, rubber, and which operates at elevated temperatures. In such a system, cyclic substituents that are attached to the amino group of cyanamide will be found to be very useful.

In admixture with castor oil or other known oxygen-containing organic liquids usually employed as components of brake fluid compositions, cyanamide derivatives, especially those having alkyl substituents, will remain in phase with said organic liquids over greater extremes of temperature and will beneficially serve to reduce appreciably the increasing viscosities of said organic liquids at sub-zero temperatures. In particular, alkyl cyanamides, whose substituted radicals comprise not more than three carbon atoms each, have the property of effectively reducing the viscosity at sub-zero temperatures of said oxygen-containing organic liquids. A further advantage is inherent in said alkly cyanamides. They possess a minimal solvent-power for rubber, or the like, and in consequence of their use, little swelling of the rubber portions of hydraulic systems will be encountered. In those instances where employment is made of admixtures of some of said oxygen-containing organic liquids or where additions are made to hydraulic systems of components differing chemically from those already present therein, the divers components of said admixtures may not enter into or remain in a single phase. Additions to such admixtures, or to a component thereof, of aryl substituted cyanamides that possess a sort of universal solvent power for members of incompatible series of chemical compounds, can serve to blend diverse components into a single phase. A substituted cyanamide containing ricinoleyl radicals provides characteristics in said derivative similar to those of castor oil and can serve under certain conditions as a brake fluid. However, where a diricinoleyl cyanamide may be too viscous, a single ricinoleyl group and another group, for example, a phenyl group can provide a substituted cyanamide of lower viscosity.

In general, the above-described and widely varying characteristics in fluid media required for various employment in divers hydraulic-pressure equipment can be furnished by either a compound, or compounds, or mixtures containing compounds having the general structural formulae of substituted cyanamides, i. e., $R_1HNCN$ and $R_1R_2NCN$ and wherein $R_1$ and $R_2$ are appropriately chosen from such organic radicals as, for example, the alkyl, aryl, aralkyl, alkanol, acyl, alicyclic and heterocyclic groups, or radicals forming a ring system with the nitrogen atom of the amide group. Some examples of especially useful compounds are the following: dimethyl cyanamide, diethyl cyanamide, dipropyl cyanamide, diisopropyl cyanamide, di-n-butyl cyanamide, di-secondary butyl cyanamide, diisoamyl cyanamide, dihexyl cyanamide, diphenyl cyanamide, dinaphthyl cyanamide, ditolyl cyanamide, dibenzyl cyanamide, di-beta-phenyl ethyl cyanamide, diethanol cyanamide, dipropanol cyanamide, diisobutanol cyanamide, diacetyl cyanamide, dipropionyl cyanamide, distearyl cyanamide, dicyclohexyl cyanamide, dicyclopentyl cyanamide and difurfuryl cyanamide.

Usually, the substituted organic groups represented by $R_1$ and $R_2$ in the cyanamide structure are univalent and, as previously stated, the preferred characteristics can be imparted to the cyanamide structure by two of the same of such univalent groups or by two different univalent groups of substituents such, for example, as is the case in methylethyl cyanamide, isoamylphenyl cyanamide and ethylnaphthyl cyanamide. However, divalent organic groups can be substituted in the cyanamide structure to impart their particular characteristics as, for example, in N-cyanopiperidine and N-cyanomorpholine. It is to be understood, of course, that admixtures in varying proportions of different substituted cyanamides can be employed to meet varying specifications for a pressure-transmission fluid. Each cyanamide component of said admixtures will impart its own beneficial characteristics, provided by substitution therein of the same or different univalent groups, or of a divalent group.

An example of a composition that is especially suitable for use as the pressure-transmission fluid in the hydraulic-brake systems of automobiles and airplanes, comprises alkyl substituents in the cyanamide structure and more particularly diethyl cyanamide in admixture with castor oil. In the proportions of about 60 parts diethyl cyanamide and 40 parts castor oil the new admixture has a high boiling point, being in excess of about 180° C., yet remains very fluid and becomes only slightly cloudy in appearance at —46° C. Such mixture of diethyl cyanamide and castor oil is chemically stable and is inert when in contact with metals and rubber and it will tolerate a considerable proportion of water without becoming cloudy, and when in contact with such metals as aluminium, copper, brass, and iron, even at temperatures ranging from 60° C. to nearly the boiling point of water for many days, the metals show no signs of corrosion nor serious decomposition of either component of said admixture. Further, the rubber plunger-caps of hydraulic brake systems in contact with undiluted diethyl cyanamide measured 1.06 inches in diameter at the beginning of a one-year test period and at the end of that time measured 1.07 inches in diameter, a swelling of only about one per cent, which is far below the allowable 8 per cent to 10 per cent for normal brake fluids.

As previously stated, fluid compositions of such sundry and diverse characteristics as those required for use in the many different applications of pressure-transmission apparatus can be prepared from admixtures of the above-described substituted cyanamides with oxygen-containing organic liquids and especially from those liquids having boiling points in excess of about 130° C.; for example, the polyhydric alcohols or other compounds or admixtures of said compounds wherein the hydroxyl groups of said polyhydric alcohols are wholly or partially esterified, or etherified, or are wholly or partially both esterified and etherified as is the case in diethyl ether of diethylene glycol, and castor oil which is an ester of glycerine. Further examples of such oxygen-containing organic liquids include glycerine, ethylene glycol, diethylene glycol and 2-methyl-2,4-pentane diol. The said oxygen-containing organic liquids of themselves can be somewhat corrosive to metals, yet in a composition with said cyanamide derivatives their corrosive activity is substantially inhibited. In those compositions where corrosive action on certain metals or metal combinations is excessive, such customary corrosion inhibitors as, for example, nitrites or organic sulphur compounds can be added thereto, or known corrosion-inhibiting groups can be introduced into a substituted cyanamide. An admixture comprising 30 parts di-n-propyl cyanamide and 70 parts glycerine provides a composition suitable for use in the hydraulic brake systems of automobiles. The proportions of substituted cyanamides in admixture with castor oil or with other oxygen-containing organic liquids can be empirically determined to suit a particular requirement. With high-boiling cyanamide derivatives as much as 90 parts thereof can be admixed with 10 parts castor oil, or the like, to yield compositions suitable for use as power transmission media.

It is also possible to admix substituted cyanamides with petroleum products to provide, for example, hydraulic fluid compositions having a low temperature-susceptibility over a wide temperature range, yet still retaining other favorable qualities of the said petroleum products. In general, aryl cyanamides or aralkyl cyanamides or admixtures thereof are miscible with petroleum products and provide compositions that are suitable for the present purpose, the said constituents remaining in phase at both low and elevated temperatures.

The invention as hereinabove set forth is embodied in particular form and manner but may be variously embodied within the scope of the claims hereinafter made.

I claim:

1. For hydraulic fluid-pressure systems, a hydraulic liquid composition having relatively complete inertness to metallic and rubber parts thereof, and comprising diethyl cyanamide, as a main portion of the active pressure-transmitting medium and castor oil.

2. A hydraulic liquid composition for hydraulic fluid-pressure systems comprising about 60 parts by volume of diethyl cyanamide, as a main portion of the active pressure-transmitting medium, and about 40 parts by volume of castor oil.

3. An hydraulic-fluid power-transmitting composition comprising an admixture of alkyl cyanamide, as a main portion of the active pressure-transmitting medium, and castor oil, that boils above about 180° C. and is still flowable at about −46° C.

4. The method of transmitting power from one region to another of an hydraulic pressure system by means of a liquid comprising castor oil in admixture with, as a main portion of the active pressure-transmitting medium, a substituted organic derivative of the compound cyanamide containing at least one radical selected from the group consisting of alkyl, aryl, aralkyl, alkanol, acyl, alicyclic and heterocyclic radicals and radicals forming a ring system with the nitrogen atom of the amide group of cyanamide, the members of said group of organic radicals having respectively the characteristics of forming stable substantially non-volatile compounds with cyanamide that are stable at extremes of atmospheric temperatures and are insoluble in rubber and non-corrosive of metals such as are employed in mechanical pressure-transmitting systems.

5. Material for hydraulic fluid for hydraulic pressure systems comprising, as a main portion of the active pressure-transmitting medium, in admixture with other hydraulic fluid-pressure liquid of the group consisting of castor oil, diethyl ether of diethylene glycol, polyhydric alcohols glycerine, ethylene glycol, diethylene glycol and 2-methyl-2,4 pentane diol, a substituted organic derivative of the compound cyanamide containing at least one organic radical selected from the group consisting of alkyl, aryl, aralkyl, alkanal, acyl, alicyclic, and heterocyclic radicals and radicals forming a ring system with the nitrogen atom of the amide group of the compound cyanamide, the members of said group of organic radicals having respectively the characteristics of forming stable substantially non-volatile compounds with cyanamide that are stable at extremes of atmospheric temperatures and are insoluble in rubber and non-corrosive of metals such as are employed in mechanical hydraulic-pressure-transmitting systems.

6. As a hydraulic medium for transmitting power hydraulically in a closed system, a liquid containing at least one of the group consisting of castor oil, polyhydric alcohols diethyl ether of diethylene glycol, glycerine, ethylene glycol, diethylene glycol and 2-methyl-2,4 pentane diol, and, as a main portion of the active pressure-transmitting medium, a relatively stable organic derivative of the compound cyanamide that has an organic radical as a substituent on the nitrogen atom of the residue of the amide group of the compound cyanamide.

7. A hydraulic liquid composition for hydraulic fluid-pressure systems comprising di-n-propyl cyanamide, as a main portion of the active pressure-transmitting medium, and a polyhydric alcohol in a ratio of 30 parts to 70 parts respectively.

WILLIAM H. HILL.